June 15, 1965

W. A. WOOTTEN 3,189,684

SYSTEM FOR RECORDING AND REPRODUCING SIGNALS WITH MAGNETIC TAPE

Original Filed Dec. 11, 1953

3 Sheets-Sheet 1

INVENTOR.
WILLIAM A. WOOTTEN
BY [signature]
Attorney

June 15, 1965 W. A. WOOTTEN 3,189,684
SYSTEM FOR RECORDING AND REPRODUCING
SIGNALS WITH MAGNETIC TAPE
Original Filed Dec. 11, 1953
3 Sheets-Sheet 2

INVENTOR.
WILLIAM A. WOOTTEN
BY
Attorney

INVENTOR.
WILLIAM A. WOOTTEN
BY Forest J. Lilly
Attorney

United States Patent Office 3,189,684
Patented June 15, 1965

3,189,684
SYSTEM FOR RECORDING AND REPRODUCING SIGNALS WITH MAGNETIC TAPE

William A. Wootten, 1324 Palos Verdes Drive W., Palos Verdes Estates, Calif.

Continuation of application Ser. No. 397,570, Dec. 11, 1953. This application Dec. 8, 1959, Ser. No. 858,292
2 Claims. (Cl. 178—6.6)

This invention relates to improved methods and apparatus for recording and reproducing electrical signals with magnetic tape. In the present specification, the phrase "magnetic tape" refers to any type of tape capable of temporarily or permanently retaining the characteristics of a magnetic field to which it is exposed. Such tape is well known in the art and generally comprises a carrier of cellulose acetate incorporating magnetic particles and coated with a suitable metallic oxide.

This application is a continuation of my application Serial No. 397,570 filed December 11, 1953, now abandoned, and entitled System for Recording and Reproducing Signals With Magnetic Tape.

In my copending United States application Serial No. 335,731, filed February 9, 1953, now U.S. Patent 2,933,555 and entitled System for Modulating a Magnetic Field for Electrical Reproduction, there is disclosed a system for recording on and reproducing from a magnetic tape a television program. In this system the signals to be recorded are employed to modulate either the current density or velocity of a beam of charged particles whereby the magnetic field existing about such beam is modulated. The modulated magnetic field in turn reacts with a fixed magnetic field to provide a net modulated magnetic field which is recorded on a moving tape.

The present invention makes use of many of the theories and principles set forth in the above-referred-to application but is primarily concerned with improved apparatus for the recording and reproduction of the television signals.

Ordinarily, the higher the frequencies of signals to be recorded on a magnetic tape, the faster must the tape be moved across the recording head if tolerable fidelity is to be achieved. At television signal frequencies, for example, the travel speed of the tape must be so great, in order to preserve a reasonable amount of fidelity, that a relatively long length of tape is required to record only a small amount of information.

As disclosed in the above-referred-to copending application and in the instant invention, instead of rapidly moving the tape across the recording apparatus, a beam of charged particles is employed to sweep across the tape transversely and place the signal thereon during the sweep period. The tape may then be moved at a rate just sufficient to prevent overlapping of the various sweeps. As a result of this system, very slow tape speed may be used resulting in considerably more information being recorded on a given length of tape as well as greater economy in the manufacture of the necessary tape handling apparatus. A somewhat wider than normal tape, however, is necessary to accommodate the transverse recording.

Even though a somewhat wider dimensioned tape than normal is used, a relatively large amount of information must be accommodated by this width dimension. In conventional tape recording systems, the magnetic field acting on the tape generally reverses in direction at a frequency corresponding to the frequency of the signals to be recorded. This reversal of the magnetic field through the tape serves to rotate the magnetic particles approximately 180° which reorientation of the particles is retained and represents a characteristic of the signals to be later reproduced. Due to a complete reversal of the magnetic particles, only a limited amount of information for any particular exposure time can be recorded over a given distance of tape. Generally the transverse dimension of a tape, even though widened considerably, would not be sufficient to retain a record of the video signals in one scan line of a television program.

One of the important objects of the present invention is to provide a novel means for recording signals on a tape in which the amount of information per unit distance of tape is considerably more than heretofore thought possible.

In the instant invention, the above object is realized by providing what may be termed a "D.C. magnetic field recording system." The arrangement is such that a uniform biasing magnetic field is passed in one direction normally through the tape and the modulated magnetic field representing the signal frequency modifies the principal field to provide a net modulating magnetic field having a warped configuration. Simultaneously, this net field is augmented or diminished in accordance with the signal frequency. At no time, however, is the general direction of the magnetic field reversed although it may be angulated. The magnetic particles which tend to align themselves with magnetic lines of force are thus angulated rather than reversed and more information can be recorded per unit tape length than would be the case otherwise. This is because the degree of angulation is sufficient to retain the signal record rather than a complete reversal.

With the above arrangement coupled with the fact that the beam sweep speed is high, the signal transferred to the tape is relatively small. However, this small signal on the tape is not serious so long as some characteristic of the signal is retained. This is because in reproducing the signals from the tape, very high gain video amplifiers are available to reproduce the signals with sufficient fidelity.

Even though weak signals on the tape may be adequately reproduced, there is still somewhat of a recording problem involved in positioning the tape sufficiently close to a sweeping electron beam for the magnetic field about the beam to have an effect. This problem comes about primarily because of the necessity of having the beam pass through an evacuated enclosure while the tape itself is normally outside the vacuum.

Another important object of the present invention, accordingly, is to provide an improved apparatus for positioning the moving tape as close to the scanning beam as possible while the beam operates in vacuum.

In accordance with the present invention, the above object is realized by providing an elongated evacuated tube for housing the electron gun apparatus. Substantially midway of the ends of the tube, a side surface of the tube is pinched in to form a V groove shape, and suitable guide means are provided for guiding the tape into this V groove, causing the tape to follow closely the glass or metal wall defining the groove. The bottom of this groove is provided with a longitudinal slot running transversely of the tube in which there is fitted a mica glass window of extremely thin dimension. The geometry of the groove is such that the window is as close to the sweep path of the beam as possible. The tape is thus permitted to pass relatively close to the sweeping beam. Further, the electron gun focusing apparatus is designed to position the focus crossover point at the window position whereby the beam of charged particles is relatively thin at this point.

In reproducing apparatus for detecting the signal on the tape, a similar tube construction is employed for positioning the tape as closely as possible to a sweeping electron beam whereby the field set up by the angulated positions of the magnetic particles in the tape will be capable of influencing the beam direction. Suitable static charge pickup plates are positioned adjacent the deflected beam resulting in a modulation in the charge content of these plates in accordance with the tape signals. This charge modulation provides a signal current which may be amplified to reproduce the original signal.

A better understanding of the present invention and its various objects and advantages will be had by referring to the accompanying drawings, in which.

Figure 1:
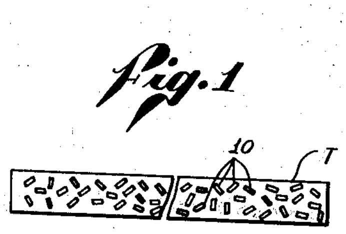
FIG. 1 is a greatly enlarged schematic transverse cross-section of a magnetic tape.
Figure 2:
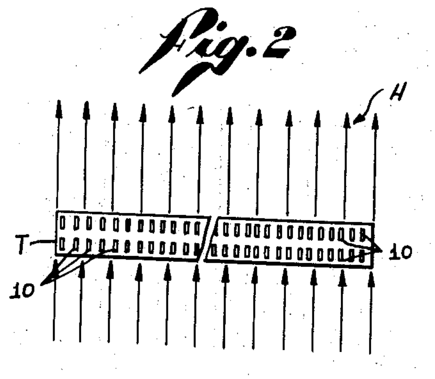
FIG. 2 is a view similar to FIG. 1 showing the effect of a uniform magnetic field on the tape.

Referring to FIG. 1, there is shown in transverse cross-section a magnetic tape of somewhat greater width dimension than normal as indicated by the cut. Illustrated schematically throughout the thickness of the tape there is shown a plurality of minute magnetic particles 10 which have the property of tending to aline themselves with the lines of force of a magnetic field. As shown in FIG. 2, for example, a uniform magnetic field passing upwardly from the bottom of the tape and through the tape will aline the various magnetic particles 10 in a generally vertical direction.

If now a further magnetic field is introduced in the vicinity of the tape T and the uniform field H, the net resulting magnetic field pattern will result in angulated lines of force diminished or augmented depending upon the direction of the further magnetic field.

Figure 3:
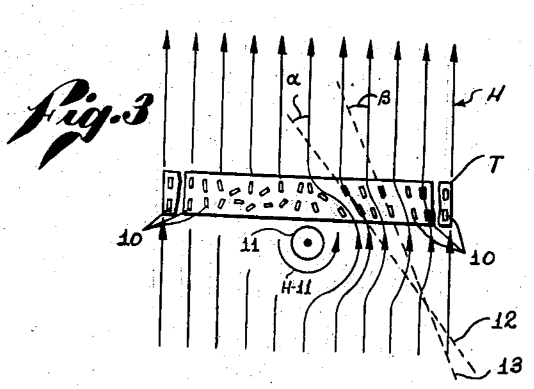
FIG. 3 is a view similar to FIG. 2 illustrating the effect of an additional magnetic field.

As shown in FIG. 3, for example, there is provided a further magnetic field H–11 resulting from a beam 11 of charged particles constituting a current. Conventionally, current flow is in a direction opposite to actual electrical charge flow and therefore in the illustration of FIG. 3 the magnetic field H–11 is shown encircling the beam 11 in a counterclockwise direction when the current is coming out of the paper as indicated by the dot. Actually the electrical charge flow would be normally into the paper for the field H–11 to be in this direction. As shown, the magnetic field H–11 combines with the uniform field H to provide curved augmented lines of force to the right of beam 11. Accordingly those magnetic particles closely adjacent the beam 11 at this point are angulated to a greater extent that those magnetic particles slightly further away. This angulation is illustrated by the angle axis 12 forming an angle $\alpha$ with respect to the vertical and the angle axis 13 forming an angle B with the vertical, the angle B being somewhat less than the angle $\alpha$. If the beam 11 is swept transversely under the tape T, the various particles will be angulated in accordance with the field strength of the magnetic field H–11 and the tape T will retain this particular net field characteristic.

Figure 4:
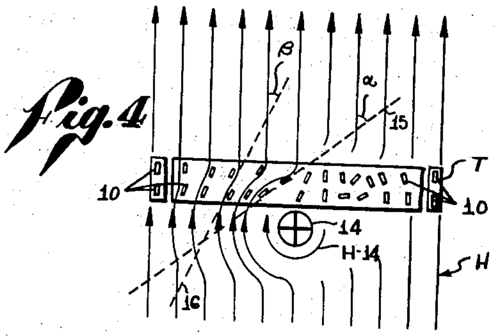
FIG. 4 is a view similar to FIG. 3 illustrating the effect of such additional magnetic field when in the opposite direction.

FIG. 4 illustrates conditions similar to those shown in FIG. 3 wherein a beam of charged particles 14 is coming normally out of the paper, or if deemed a current, passing normally into the paper as indicated by the cross. In this case the magnetic field H–14 set up about the beam 14 is in a clockwise direction and therefore those magnetic particles closely adjacent the left of the beam 14 are angulated to a greater extent than those slightly further away as indicated by the angle axis 15 and angle $\alpha$ and the angle axis 16 and angle B, respectively.

It should be noted that in FIGS. 3 and 4, respectively, the magnetic particles to the left of the beam 11 and to the right of the beam 14 are more or less arranged in a haphazard manner inasmuch as the fields H–11 and H–14 tend to annul the effect of the uniform magnetic field H at these points in each instance. Since the tape T is arranged to move longitudinally, that is, in a direction normal to the plane of the drawing, this erasing effect will not disrupt the previously angulated magnetic particles as a new section of tape will be moved under the beam as it sweeps transversely under the tape.

Figure 5:
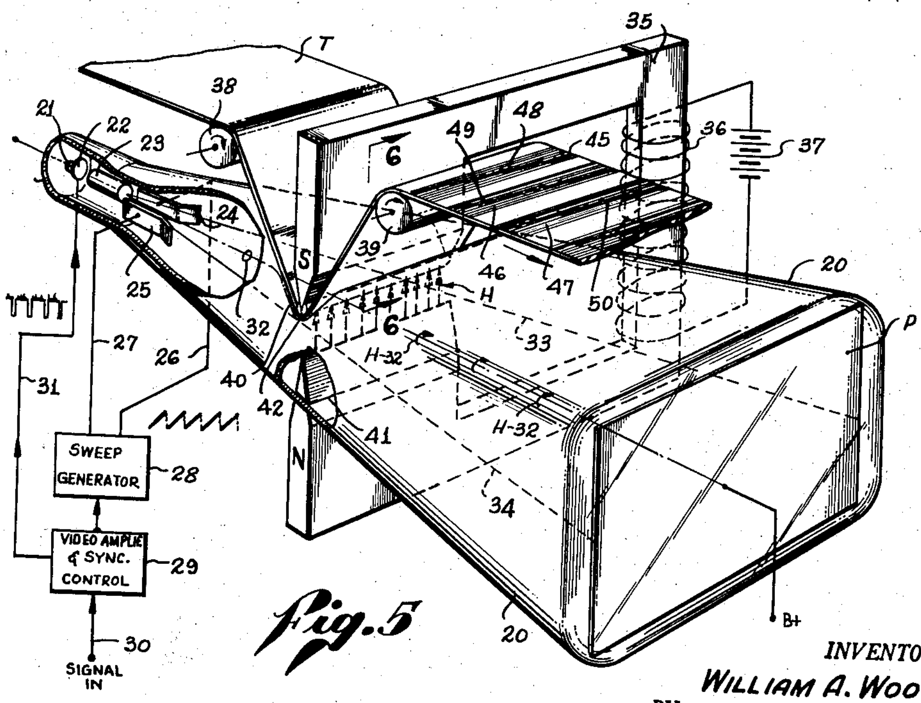
FIG. 5 is a highly schematic diagram illustrating one form of recording apparatus for recording television signals on a magnetic tape of the type illustrated in FIGS. 1–4.

Referring now to FIG. 5, there is illustrated schematically an apparatus for recording on a moving tape T a television program wherein the above-discussed principles of recordation are employed. As shown, the apparatus comprises an elongated flared tube structure 20 which may be glass or metal and defines an evacuated enclosure for an electron beam. The beam itself is generated in the conventional manner by means of a cathode 21, control grid 22, focusing anode tube 23, and horizontal deflection sweep plates 24 and 25. The plates 24 and 25 are connected through leads 26 and 27 to a conventional sweep generator 28. Sweep generator 28 is controlled and properly synchronized by a suitable signal from a video amplifier and synch control circuit 29. The input television signal to be recorded on the tape is fed in at 30 and the synchronizing pulse inherent in this signal is adapted to trigger a suitable wave shaping circuit to provide periodically blanking negative gate pulses through conductor 31, together with the video signal, to the grid 21 as indicated in FIG. 5. The negative gating pulses serve to blank the beam during the flyback time of the sawtooth sweep wave. Other connections to the cathode 21 and focusing anode tube 23 are conventional.

The generated electron beam or pencil 32 passes longitudinally down the tube 20 to an anode plate P connected to a source of high voltage B+ as shown. About the electron beam 32 there exists a circular magnetic field H–32. The current density upon which the magnitude of the magnetic field H–32 depends is controlled in accordance with the video signals on the control grid 22. The deflection plates 24 and 25 will sweep the beam transversely across the anode plate P between the sweep limits indicated by the dotted lines 33 and 34. In the particular embodiment shown for illustration, this sweeping beam is arranged to move from the left to the right, that is, from the line 33 to the line 34, and during the flyback time of the beam, the negative blanking pulses on the grid lead 31 will blank the beam.

Substantially midway of the ends of the tube structure 20, there is provided a C-shaped magnetic member 35 for providing a uniform biasing magnetic field H. The magnetic member 35 may be a permanent magnet or, if desired, an electromagnet suitably controlled by the coil 36 and the battery 37. The south and north poles of the C magnets S and N are positioned to straddle the mid portion of the tube 20 whereby the uniform field H will pass through the tube and the path of the sweeping electron beam.

The magnetic tape T on which the video television signals are to be transversely recorded, is passed over a pair of stabilizing drums 38 and 39, a portion of the tape between these drums being looped downwardly under the end of the south pole within a pinched-in portion 40 in the top wall of the tube 20. For properly guiding the tape down within this pinched-in or V groove portion 40, there is provided a guiding means 42. The north pole N of the C-shaped magnet may pass directly into the evacuated enclosure of the tube structure 20, there being provided a suitable seal about the pole periphery. The pinched-in arrangement of the tube is provided to position the magnetic tape T as closely as possible to the sweeping electron beam in order that the magnetic field set up about the beam will influence the magnetic particles in the tape. The preferred structure of this pinched-in portion is illustrated in the enlarged view of FIG. 6.

Figure 6:
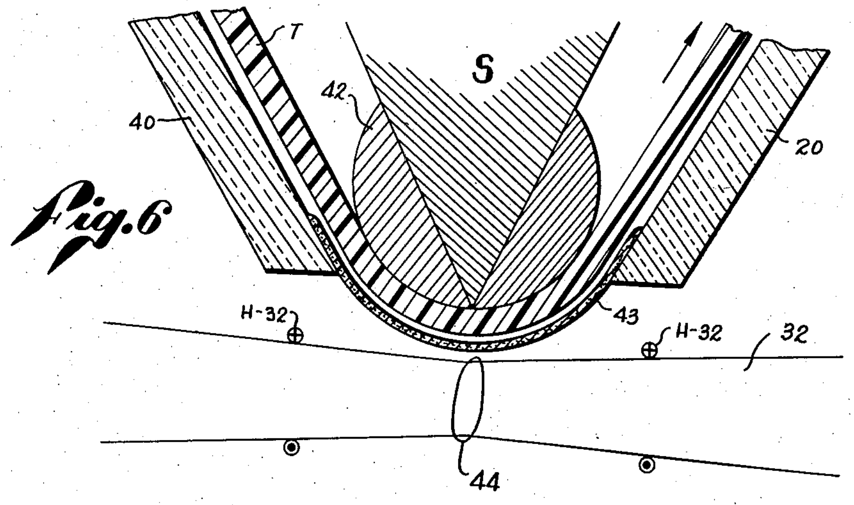
FIG. 6 is a greatly enlarged cross-section of a portion of the apparatus of FIG. 5 taken in the direction of the arrows 6—6.

As shown in FIG. 6, the bottom of the V groove 40 is provided with a longitudinal slit which runs transversely of the tube. In this slit, there is provided a mica glass window 43 suitably sealed along its longitudinal edges to the tube 20 and having a curvature which is concave as viewed from the top. Because the area of this window is extremely small, the net force acting thereon due to the atmospheric pressure difference between the inside and outside of the tube 20 is relatively small. Therefore, this mica window may be made extremely thin. With the above-described arrangement, the tape T is passed over the guide means 42 to pass between the lower end of the guide means and the upper concave portion of the mica window 43. The result is that a transverse portion of the tape T will pass relatively closely to the electron beam 32 and will respond to the net modulated magnetic field resulting from the field H–32 and the uniform field passing up through the south pole of the C-shaped magnet. The structure of the electron gun focusing anode is such that the crossover focus point of the beam 32 will be positioned directly under this mica glass window as indicated at 44.

Referring once again to FIG. 5, the operation of the recording apparatus will now be described. Consider first the usual procedure for televising a program. Normally the scene to be televised is projected as an image on a photosensitive screen. This screen is then scanned by a suitable electron beam, there being approximately 262½ scan lines covering the image each 1/60 of a second and a second group of 262½ scan lines interlaced with the first group to provide a total number of 525 individual scan lines each 1/30 of a second. The 525 scans are interspaced to provide a uniformity in illumination for each frame in subsequent reproduction of the televised picture.

Associated with each scan in the televising apparatus are a group of video signals. These signals vary in accordance with the light and dark spots on the image over which the scan line extends. It is the video signals in each scan line which are recorded transversely on the magnetic tape T of the present invention. Thus, the sweeping beam 32 of the apparatus shown in FIG. 5 is adapted to sweep once from the dotted line position 33 to the dotted line position 34 for each scan line and the video signals of the scan line are recorded transversely on the tape during this period. In the enlarged schematic view of FIG. 5, three full scan line sweeps are represented on the tape T by shaded areas 45, 46 and 47, the corresponding video signals being represented by the transverse diagonal wave forms 48, 49 and 50, respectively. The manner of placing these signals on the tape is as follows:

The video signal for each scan is passed into the video amplifier and synch control mechanism 29 as shown at 30. The synchronizing pulse which determines the beginning and end of each scan of the beam in the televising instrument synchronizes the sweep generator 28 so that the electron beam 32 scans under the tape T in the tube 20 at a corresponding rate. The sawtooth wave form for accomplishing this is indicated schematically adjacent the lead 26. Simultaneously, the video signals for each scan line are fed up through the lead 31 to the grid 22 of the electron gun apparatus. These signals serve to modulate the current density of the electron beam 32 whereby the magnetic field about this beam H–32 is also modulated. The negative gating pulses blank or cut off the sweep during the flyback time; that is, during the corresponding time that the televising electron beam is shut off.

As discussed in connection with FIGS. 1–4, the signal modulated magnetic field H–32 of the beam 32 will combine with the uniform field H set up between the north and south poles of the C-shaped magnetic member 35 to provide a net modulated magnetic field of warped or angulated lines of force diminished or augmented in magnitude in accordance with the strength of the video signal appearing on the grid 22. As the beam 32 sweeps under the tape transversely, the magnetic particles on only that portion of the tape passing under the guide bead 42 are angulated. Since the tape is moving over the drums 38 and 39 in a longitudinal direction simultaneously with the sweeping beam, the resulting video signal on the tape, as represented at 48, for example, will extend slightly in a diagonal direction. Thus, new unexposed portions of the tape are brought under the sweeping beam at all times and there is no chance of the signal placed on the tape due to the warped magnetic lines of force on one side of the beam, being erased by the corresponding diminished lines of force occurring on the other side of the beam. This situation results since, by the time the far side of the beam reaches the near side, the tape has moved a sufficient distance to present a new unexposed portion. The uniform field H may be adjusted in magnitude for optimum results by adjusting the voltage of the battery 37.

With the above-described arrangement, it will be seen that the complete televised program may be recorded on the magnetic tape T even though the tape is moved relatively slowly. This is because of the fact that the recording takes place by a rapidly moving beam of charged particles and is placed transversely on the magnetic tape T. High fidelity may be achieved and high frequency signals recorded inasmuch as it is a rapidly sweeping beam which effects the recording on the tape rather than a rapidly moving tape. The feed of the tape over the stabilizing drums 38 and 39 need be just sufficient so that the various sweeps will not overlap. The necessary 525 scans constituting a single television frame may be recorded on a tape within a length of approximately .5 inch or less and it will be seen accordingly that the relative longitudinal movement of the tape may be less than 15 inches per second during the recording of the television program.

Figure 7:
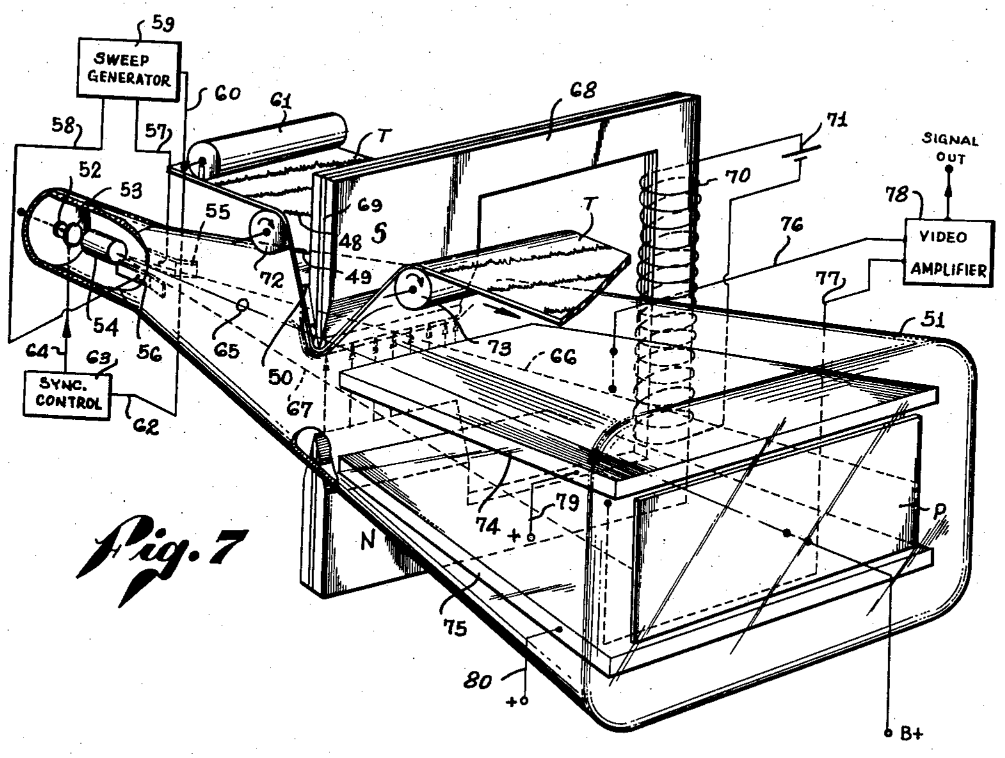
FIG. 7 is a highly schematic diagram illustrating an apparatus for reproducing signals from a magnetic tape recorded with the apparatus shown in FIG. 5.

In FIG. 7 there is illustrated a device for reproducing the video signals from the tape recorded with the apparatus of FIG. 5. In this reproducing system there is provided an elongated evacuated tube 51 housing an electron beam generating apparatus comprising a cathode 52, grid 53, focusing anode tube 54 and suitable sweep deflection plates 55 and 56. The deflection plates are connected through leads 57 and 58 to a sweep generator 59 synchronized through a lead 60 connected to a synch signal pickup head 61. The synchronizing head 61 is also connected through a lead 62 to a synch controlled wave shaping circuit 63 connected by lead 64 to the grid 53. The beam of electrons 65 produced by this arrangement of elements is adapted to sweep horizontally transversely of the tube between the dotted line limits 66 and 67 terminating on an anode plate P connected to a source of high voltage B+.

In reproducing the signal from the magnetic tape T, the magnetic field patterns set up by the magnetic particles in their angulated positions are employed to influence the direction of the beam 65. A flux path to permit the magnetic lines of force to close on themselves and thus provide a magnetic field through which the beam can pass is provided by a generally C-shaped member 68 supporting a thin magnetic lamina material 69 of high magnetic permeability. In addition to this flux path, it is sometimes desirable to provide a small biasing magnetic field, and this may be accomplished by the coil 70 about the C-shaped lamina, connected to a battery 71. The purpose of the small uniform biasing field is to provide in combination with the magnetic field set up by the particles in the tape, a net magnetic field of sufficient strength to deflect the beam a detectable amount in accordance with the video signals on the tape.

The tape itself is supported to travel closely to the beam by means of stabilizing drums 72 and 73 on either side of the south pole of the lamina biasing magnet 69, the portion of tape between the stabilizing drums being looped downwardly under this south pole about a suitable guide bead similar to the guide bead 42 shown in FIG. 6.

To detect beam movements there is provided in the tube 51 a pair of electrostatic plates 74 and 75 connected by leads 76 and 77 respectively to a video amplifier 78 from which the output signal is derived. These plates 74 and 75 are charged slightly positive through leads 79 and 80, respectively. This small positive charge prevents stray electrons from the beam 65 from actually hitting the plates.

With the above arrangement, it will be appreciated that as the sweeping beam 65 is deflected from its horizontal plane of sweep due to the varying video signals on the tape T it will move towards or away from either one of the plates 74 or 75. Since the beam constitutes charged particles itself, the net charge content on the plates will be modulated in a push-pull manner in accordance with such beam movements. This change in the net charge of the plates 74 and 75 sets up currents in the conductors 76 and 77 which currents are amplified in the video amplifier 78 to provide an output signal. The output signal corresponds to the orginal video input signal recorded on the tape.

In order that the beam 65 may be swept in synchronism with the signals 48, 49 and 50 on the tape T, a conventional type pickup head 61 detects the synchronizing pulse at the beginning of each scan in the video signal, feeding this pulse into the synch control circuit 63 for properly blanking the sweep beam 65 on its flyback and also for synchronizing the sweep generator 59. Proper synchronization is thus maintained in the reproducing apparatus.

Figure 8:
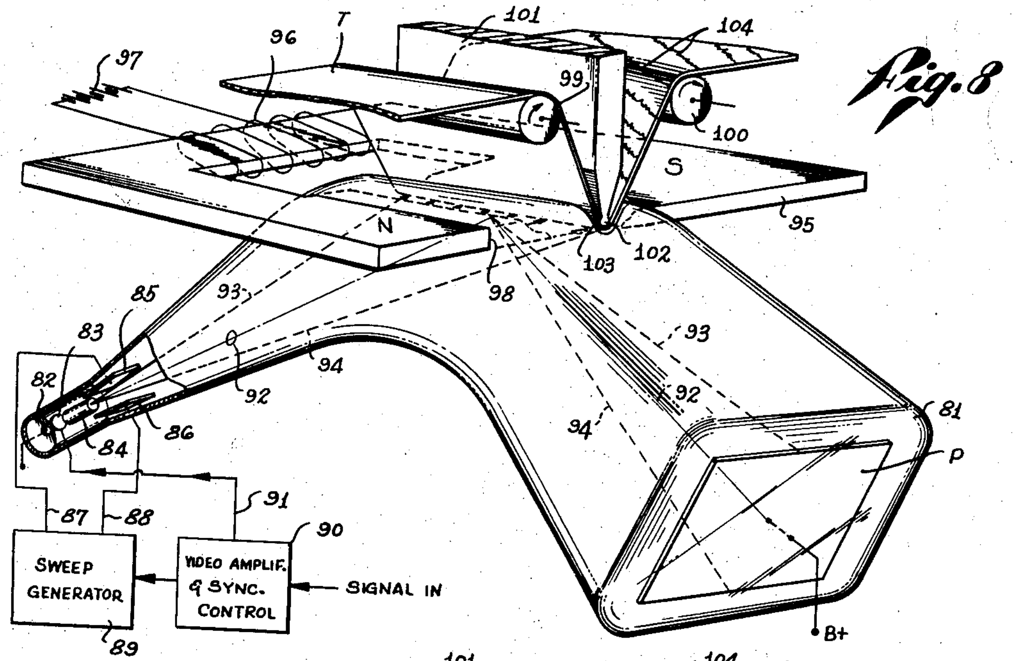
FIG. 8 shows a modified type of apparatus for recording television signals on a magnetic tape.

FIG. 8 shows a modified type of recording apparatus in which the uniform magnetic field to be modulated to provide a net modulated field is passed through the tape in a generally horizontal direction. In this case the sweeping beam is made to sweep in a vertical plane transverse to the plane of the moving tape. As shown, the arrangement comprises a generally bent tube or metallic housing 81 provided at its narrower end with a cathode 82, control grid 83, focusing anode 84 and vertical deflection sweep plates 85 and 86. These deflection plates are connected through leads 87 and 88 to a sweep generator 89 in turn fed from a video amplifier and synchronizing control circuit 90 into which the input signal is fed. The video signal is passed through a conductor 91 to the grid 83 while the synchronizing pulse passes to the sweep generator.

The electron beam in this recording apparatus is indicated at 92 and is arranged to sweep in a vertical plane between the limits indicated by the dotted lines 93 and 94. The beam 92 is caused to follow a curved path, the knee of the curve being arranged to sweep transversely along the tape T. This deflecting or curving of the beam is accomplished by means of a C-shaped magnet 95 having north and south poles straddling the knee-bend portion of the tube 81 to pass a horizontal magnetic field therethrough. The electron beam 92 on entering this horizontal magnetic field is caused to curve downwardly to pass along the forward branch of the tube 81 to an anode plate P connected to a source of high voltage B+.

The north and south poles N, S, of the C magnet 95 also provide a uniform biasing field which is adapted to be modulated by the circular magnetic field set up about the electron beam 92 to provide a net magnetic field. The biasing field may be established by a coil 96 about magnet 95 connected to a battery 97. The poles themselves may be positioned relatively close to the point where the signal is to be transferred onto the tape by passing them through suitable glass seals in the tube walls as at 98.

The tape itself passes over stabilizing drums 99 and 100, the portion of tape therebetween extending downwardly under a support block 101 and around a guide tip 102 positioned in a V-shaped groove 103 extending longitudinally along the top of the tube 81 at the knee-bend portion. This pinched-in groove 103 and the corresponding guide tip 102 are identical to the structure shown in FIG. 6, there being provided a suitable mica window whereby the tape T may be positioned relatively closely to the magnetic fields set up by the magnet 95 and the electron beam 92.

In operation, the video signal resulting from each scan line in the televising apparatus, is fed into the video amplifier and synchronizing control circuit 90 and thence to the grid 83 through the lead 91. This signal on the grid 83 will modulate the current density of the beam 92 as it is swept between the vertical plane limits 93 and 94. A signal line is therefore placed on the tape transversely, and slightly diagonally as it passes under the guide tip 102 resulting in a series of tape exposures as indicated at 104. These signals will be representative of the video signals during each scan since the sweep of the beam 92 from one end of the V groove 103 to the other corresponds to the scanning televising sweep and since the magnetic field about the beam 92 is modulated in accordance with the video signals during any one sweep. The same principles of magnetic field interaction will result in a net modulated field causing an angulation of the magnetic particles in the tape.

Figure 9:
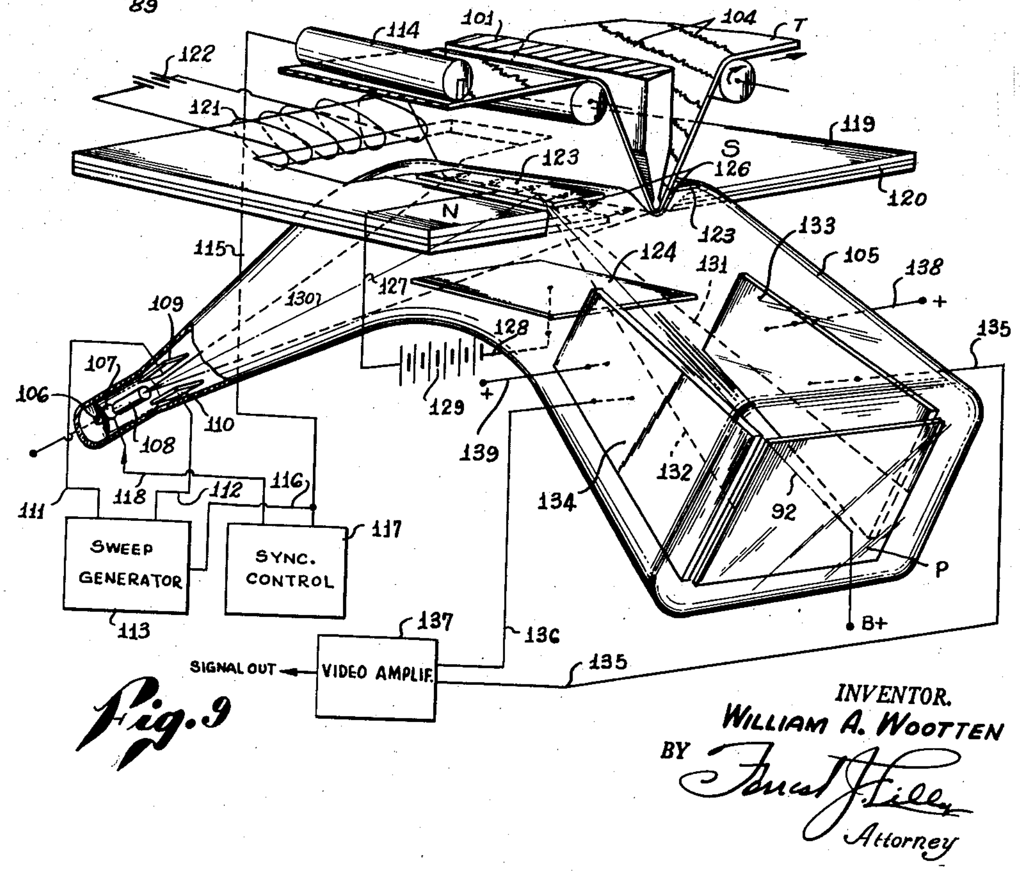
FIG. 9 illustrates an apparatus for reproducing signals from a magnetic tape recorded with the apparatus shown in FIG. 8.

FIG. 9 shows a modified reproducing apparatus for reproducing the signals recorded with the apparatus of FIG. 8. This reproducing system employs a similar type of bent tube 105 provided with a conventional cathode 106, grid 107, focusing anode tube 108, and sweep deflection plates 109 and 110. The deflection plates are connected through leads 111 and 112 respectively to a sweep generator 113. Synchronization of the sweep is accomplished by a conventional pickup head 114 positioned above the tape T and connected to the sweep generator 113 through a lead 115 and branch lead 116. This synchronizing control signal also passes into a synchronizing control circuit 117 connected to the grid 107 of the tube through a lead 118 to provide proper blanking of the sweep beam during the flyback time.

As in the case of the reproducer shown in FIG. 7, there is provided a return flux path for the magnetic field set up by the magnetic particles in the tape T. This flux path comprises a generally C-shaped member 119 supporting a magnetic lamina 120 of high permeability. A further biasing magnetic field may be provided between the north and south poles of the magnetic lamina 120 by means of a coil 121 and battery 122.

It is important in the reproducer that there not be too strong a magnetic field across the tape as otherwise the sensitive magnetic field resulting from the magnetic particles will be masked. Therefore, some other means for bending the beam in the direction of the anode plate P must be used. For this purpose there are provided a pair of additional deflection plates horizontally positioned as shown at 123 and 124. The upper plate 123 is provided with a slot 126 along its center to accommodate the pinched-in or V groove portion at the top knee-bend part of the tube housing. A strong electrostatic field passing from the upper plate 123 to the lower plate 124 is set up through the leads 127 and 128 connecting to a constant voltage source in the form of a battery 129. The electron beam 130 is thus caused to bend around in a curved path between these plates, the knee-point of the curve sweeping in a vertical plane transversely of the tape in response to the sawtooth sweep wave on the deflection plates 109 and 110. When there is no signal on the tape, the beam 130 will remain substantially in a vertical plane to strike the accelerating anode plate P. However, when any signal is on the tape, the magnetic field set up thereby is in such a direction that when combined with the magnetic biasing field from the lamina 120, a lateral deflection of the beam occurs between the limit lines 131 and 132.

To detect this lateral variation in the beam, there are provided vertically oriented collector plates 133 and 134. These plates are connected through leads 135 and 136 to a video amplifier 137 from which the output signal is derived. A net positive charge is maintained on each plate through leads 138 and 139 as indicated. As in the case of the reproducer of FIG. 7, this net positive charge prevents stray electrons from the beam from falling on the plate.

Since the lateral deflection of the beam 130 is in accordance with the video signals 104 on the tape as it passes about the guide bead on support 101 closely adjacent to the sweeping beam 130, the net charge on the collector plates 133 and 134 will be modulated in a push-pull manner to set up small currents in the conductors 135 and 136. These currents are amplified in the video amplifier 137 to provide the video output signal.

It is found with the construction of the device shown in FIG. 9 that a considerable lateral deflection on the beam 130 occurs even for a relatively weak signal on the tape T. Thus, in this arrangement, there results an effective magnification of the signal strength.

Both recording apparatuses of FIGS. 5 and 8 place a transverse signal on the tape and therefore the advantages of low longitudinal tape speed are attained.

Further constructional modifications within the scope and spirit of the present invention will occur to those skilled in the art. The principles are therefore not to be thought of as necessarily limited to the particular embodiments disclosed.

I claim:

1. Apparatus for recording an electrical signal current in magnetic tape comprising: a recording magnet including a gap for producing a single constant unidirectional magnetic field thereacross, means for guiding a travelling magnetic tape through said gap and generally transversely of said magnetic field, an electron gun for generating a pencil shaped electron beam and directing it transversely through said gap substantially at right angles to the field across said gap, and generally longitudinally of the direction of tape travel through said gap, and in close proximity to the portion of the tape within the gap, whereby the magnetic field surrounding said beam reacts with said magnetic field to produce a resultant angle modulated magnetic field, and means for periodically sweeping said beam laterally of the tape.

2. A method of recording signals on a longitudinally moving magnetic tape comprising the steps of: passing a substantially constant magnetic field through a portion of the tape in a direction transversely thereof; generating and directing a pencil shaped beam of electrical charges through said field and closely past the surface of said portion of said tape in a direction substantially at right angles to said field and longitudinally of the direction of travel of said portion of said tape, and thereby creating a further magnetic field adjacent the tape which is the resultant of said substantially constant field and the field which surrounds said beam; modulating said beam of charges and thereby said further field in accordance with said signals whereby the direction and strength of the net resulting magnetic field passing through the tape is altered; and periodically sweeping said beam laterally of said longitudinally moving tape.

References Cited by the Examiner

UNITED STATES PATENTS

| | | | |
|---|---|---|---|
| 2,165,307 | 7/39 | Skellett | 178—6.6 |
| 2,628,285 | 2/53 | Camras | 179—100.2 |
| 2,720,558 | 10/55 | Skellett | 178—6.6 |
| 2,724,021 | 11/55 | Goeppinger et al. | 178—6.6 |
| 2,857,458 | 10/58 | Sziklai | 178—6.6 |
| 2,900,443 | 8/59 | Camras | 178—6.6 |
| 2,933,555 | 4/60 | Wootten | 178—6.6 |

OTHER REFERENCES

"Video Tape Recording" (Bernstein), published by John F. Rider (New York), 1960 (page 90 relied on).

DAVID G. REDINBAUGH, *Primary Examiner.*

NEWTON N. LOVEWELL, ROY LAKE, *Examiners.*